United States Patent
Arini et al.

(10) Patent No.: US 8,751,303 B2
(45) Date of Patent: Jun. 10, 2014

(54) SYSTEMS AND METHODS OF TRACKING ONLINE ADVERTISEMENT EXPOSURE

(75) Inventors: Nick Salvatore Arini, Botely (GB); Simon Michael Rowe, Finchampstead (GB)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 13/485,759

(22) Filed: May 31, 2012

(65) Prior Publication Data
US 2013/0325583 A1    Dec. 5, 2013

(51) Int. Cl.
*G06Q 30/00*     (2012.01)
*G06Q 30/02*     (2012.01)

(52) U.S. Cl.
CPC ........ *G06Q 30/0242* (2013.01); *G06Q 30/0241* (2013.01)
USPC ....................... 705/14.41; 705/14.4

(58) Field of Classification Search
USPC ...................................... 705/14.41
See application file for complete search history.

(56) References Cited

U.S. PATENT DOCUMENTS

| | | | |
|---|---|---|---|
| 7,756,744 B2* | 7/2010 | Schiff et al. ............... | 705/14.55 |
| 2009/0172728 A1 | 7/2009 | Shkedi et al. | |
| 2011/0093327 A1 | 4/2011 | Fordyce, III et al. | |
| 2011/0093335 A1* | 4/2011 | Fordyce et al. ............ | 705/14.53 |
| 2012/0084828 A1 | 4/2012 | Rowe et al. | |

FOREIGN PATENT DOCUMENTS

KR     2009-0000221     1/2009

OTHER PUBLICATIONS

Google Inc., International Search Report and Written Opinion, PCT/US2013/043768, Feb. 17, 2014, 9 pages.

* cited by examiner

*Primary Examiner* — John G Weiss
*Assistant Examiner* — Scott C Anderson
(74) *Attorney, Agent, or Firm* — Morgan, Lewis & Bockius LLP

(57) ABSTRACT

A process tracks user advertisement exposure. To enroll a user as a panelist, the process generates a panelist ID and sends it to the user's home router. The process receives a message from the router that includes the panelist ID and a cookie ID associated with a web application. The cookie ID identifies the application and a personal device. The process stores the correlation between the panelist ID and the cookie ID in a database. The process receives an advertisement request from the personal device that includes the cookie ID. The process selects an advertisement and sends it to the personal device. The process also stores information corresponding to the advertisement request in an advertisement log, including the cookie ID and an advertisement identifier. The programs correlate the advertisement request with the panelist ID using the cookie ID. The process generates a report of the user's online advertisement exposure.

21 Claims, 15 Drawing Sheets

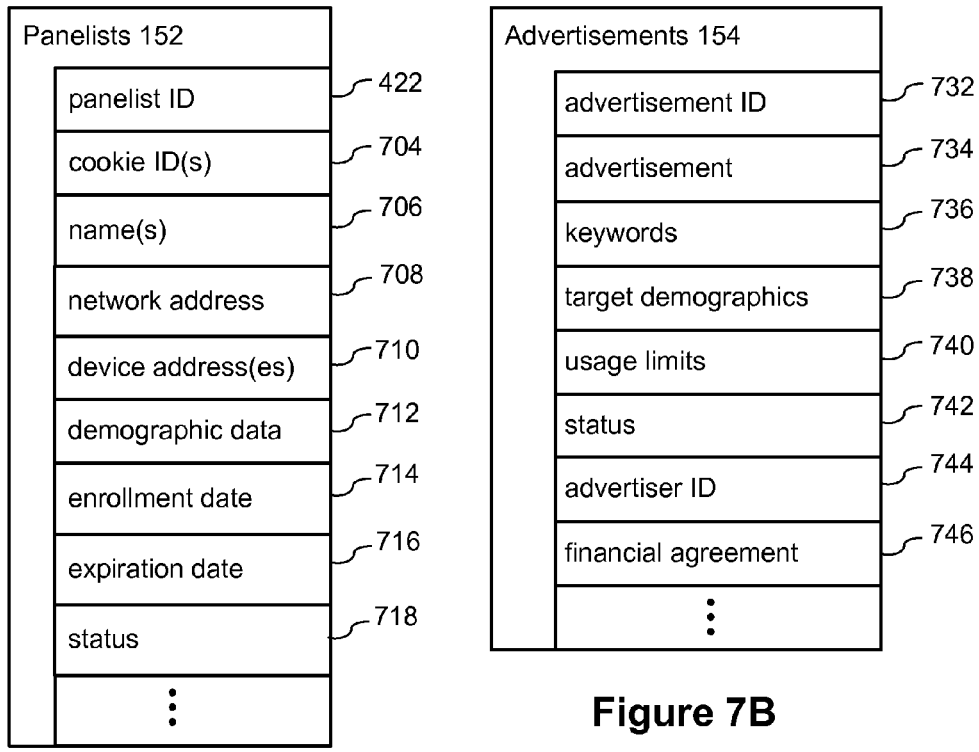
Figure 7A
Figure 7B
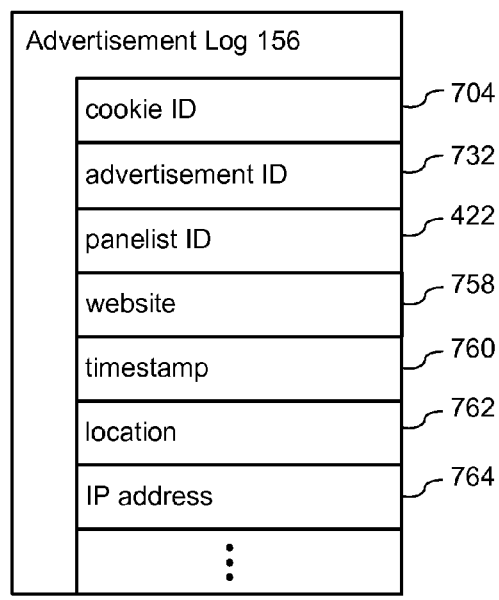
Figure 7C

SYSTEMS AND METHODS OF TRACKING ONLINE ADVERTISEMENT EXPOSURE

TECHNICAL FIELD

The disclosed embodiments relate generally to measuring advertisement exposure and more specifically to measuring online advertisement exposure on a mobile device.

BACKGROUND

Users access the Internet using computers or other devices. Using the Internet, a user can search for information, shop for clothes, books, electronic equipment, medical supplies, etc., watch videos on YouTube, connect with friends and family on social networking sites, play online games, and engage in lots of other activities. A user accesses resources on the Internet using web pages and/or web applications. In many cases, the web pages and web applications include areas designated for advertisements, and the advertisements are filled in dynamically during user access.

Measuring exposure to advertisements can provide valuable information, both for the individual user as well as for advertisers. For an individual user, measuring exposure can prevent repeated presentation of the same advertisement to the same user, and provide advertisements that are more useful for the user. For advertisers, measuring exposure can help determine the scope and effectiveness of advertising campaigns, as well as identifying characteristics of the people who see their advertisements.

Historically, information on television and Internet activity was measured by surveys or a log in/log out mechanism. Although this methodology can be useful, the data is not necessarily accurate, and the overhead costs are very high for large scale surveys. In particular, this places a burden on the users who agree to participate, and there is no guarantee that the users adhere to the process.

An alternative process involves automatic collection of data for enrolled panelists. In order to attract a sufficient number of panelists, various incentives can be provided. For example, panelists may receive cash compensation, credit towards viewing Pay-Per-View movies, discounts on premium channels, or sweepstakes entries.

In one methodology, special tracking software is downloaded to each device, and the software tracks advertisement exposure. This methodology has difficulties because of the vast array of devices that access the Internet, with varying browsers, operating systems, and limitations. In particular, it is difficult or impossible to download tracking software to some devices, and even when tracking software can be downloaded, it may not function properly because of the many variations in the devices.

As an alternative, enrolled panelists at home can have their web activity measured by a meter running on a home router. When a web application or web page serves an advertisement, the home router can track that information and send that information to a panelist server for review and reporting. In this way, the data is accurately tracked, and does not put a burden on the panelist.

This process works when computers are connected through the home router. However, there are an increasing number of mobile devices (e.g., smartphones, tablet computers, laptop computers, etc.), and these devices are not always using the panelist's home router. When the panelist is using one of these mobile devices at a location other than home, the web activity is routed through a different network, such as a local WiFi or cellular network. Advertisements presented to the user in these alternative locations are not passed through the panelist's home router. Even if an advertisement server logs all advertisement requests, the advertisements are not associated with the panelist.

SUMMARY OF THE INVENTION

Most Internet-enabled devices in a household (e.g., desktop computers, laptop computers, tablet computers, smartphones, etc.) access the Internet through a single household router. In addition to routing Internet activity to the proper destination, the router can run software to perform other functions. In particular, the router can inspect the web traffic as the data passes through, and can take actions based on that traffic. As noted above, a meter on the router can measure web activity, including requests for advertisements and the responses to those requests.

A household can register to have its web activity monitored in exchange for some benefit (e.g., monetary compensation, special offers, reduced cost for access to the Internet, parental control tools, etc.). In some embodiments, the same household will also have its television viewing activity monitored as well. The enrolled household becomes a "panelist." In some embodiments, data is tracked by individual household members, in which case the panelists are the household members.

For an enrolled panelist, the router can store a panelist ID, which uniquely identifies the panelist. The router can also detect and store cookies that are included in web requests, including a cookie ID associated with each cookie. In particular, by having access to both the panelist ID and the cookie IDs, the router is able to correlate them. The router can send a message to a panelist server so that the correlation between the panelist ID and the cookie ID is stored at the panelist server.

Because the panelist server correlates the panelist ID with the cookie IDs, panelist web activity outside the home can also be tracked. For example, when a mobile device accesses the Internet and requests an advertisement, the request includes the cookie associated with a web application. The advertisement server logs the advertisement request, including the cookie ID and an identifier for the advertisement selected. Later, the panelist server detects the log entry associated with the cookie ID, and correlates it with the corresponding panelist ID. Regardless of where the mobile device accesses the Internet, the advertisement requests are logged and later associated with the proper panelist. In some embodiments, the association of the panelist with the advertisement request is done in real time, but real-time correlation is not required.

In accordance with some embodiments, a computer-implemented method executes at one or more server systems, each with one or more processors and memory. The memory stores one or more programs for execution by the one or more processors. The programs include instructions to track advertisement exposure of an enrolled user. The programs receive a request from a home router to enroll a user as a panelist whose online advertisement exposure is tracked. The enrollment process includes generating a panelist ID that uniquely identifies the panelist and sending the panelist ID to the home router. Subsequently, the programs receive from the home router a message that includes the panelist ID and a first cookie ID associated with a first web application. The first cookie ID identifies the first web application and a unique personal user device. The programs correlate the panelist ID with the first cookie ID and store information in a panelist database that correlates the panelist ID with the first cookie ID. The programs also receive a first advertisement request originating from the personal user device. The first advertisement request includes the first cookie ID and is not routed through the home router. The programs select a first advertisement responsive to the first advertisement request and send the first advertisement to the personal user device. The programs also store information corresponding to the first advertisement request in an advertisement log, including the first cookie ID and an identifier corresponding to the first advertisement. The programs correlate the first advertisement request with the panelist ID using the first cookie ID. As soon as there are one or more records in the advertisement log associated with the user, the programs generate a report of the user's online advertisement exposure. The report includes at least a subset of the information corresponding to the first advertisement request.

Companies want to maximize the reach of web and television advertising within a budget, so having more precise data about who is accessing the web (and when) allows advertisers to avoid redundant advertising. Another advantage of some embodiments is providing better reporting of viewership information. For example, when an advertiser runs an ad campaign, the advertiser would like to know how successful it was. By providing more detailed information, advertisers can better evaluate the success of the campaign.

BRIEF DESCRIPTION OF THE DRAWINGS

FIG. 7A is an exemplary data structure for storing panelist data in accordance with some embodiments.

FIG. 7B is an exemplary data structure for storing advertisements in accordance with some embodiments.

FIG. 7C is an exemplary data structure for logging advertisement requests in accordance with some embodiments.

Like reference numerals refer to corresponding parts throughout the several views of the drawings.

DESCRIPTION OF EMBODIMENTS

To provide better viewership reporting, more accurate suggestions for content, and/or better targeted advertising, it is useful to track exposure to online advertisements even when a user is not at home. Users or households register to have their activity monitored in exchange for some benefit (e.g., personalized content, special access, monetary compensation, special offers, reduced cost for access to the Internet, parental control tools, etc.). In the registration process, users provide certain demographic information that may include the age and gender of each household member. Rather than burdening the individual users with tracking their own individual activity, disclosed embodiments utilize the household's Internet router to automatically track advertisement exposure. Reference will now be made in detail to embodiments, examples of which are illustrated in the accompanying drawings.

Figure 1:
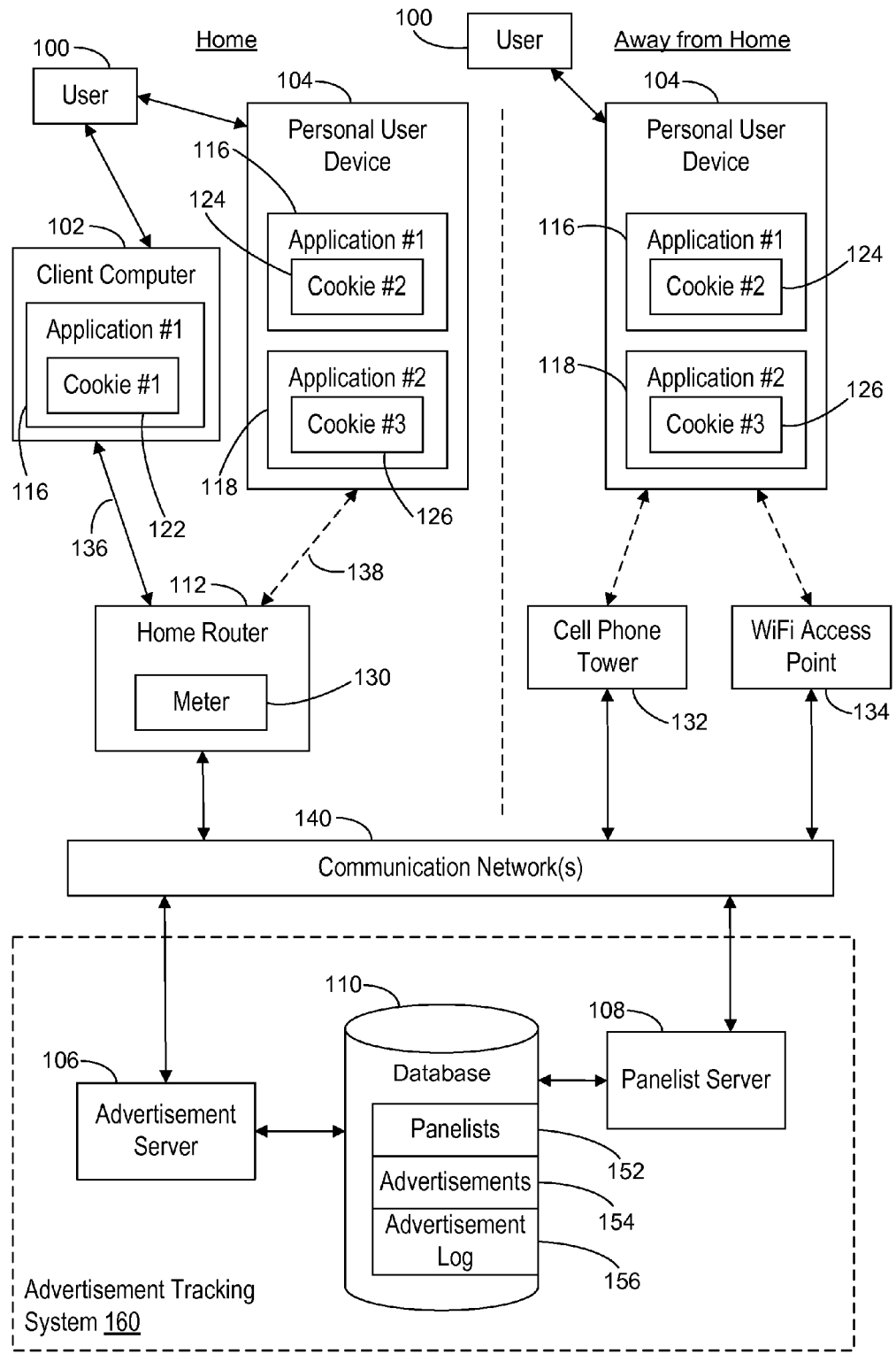
FIG. 1 is block diagrams of a system that tracks exposure to online advertising in accordance with some embodiments.

FIG. 1 is a conceptual block diagram illustrating how the advertisement tracking system 160 tracks exposure to online advertising. In this embodiment, the tracking system 160 includes an advertisement server 106 and a separate panelist server 108. The advertisement server 106 receives advertisement requests (see, e.g., FIGS. 8B and 8C below), then selects an advertisement from the advertisements table(s) 154 in the database 110. In some embodiments, the advertisement server 106 uses information from the panelist table(s) 152 (such as demographic information) and/or the advertisement log 156 to select an advertisement. The advertisement server 106 then sends the selected advertisement to the requesting device. In the illustrated embodiment, the advertisement tracking system 160 includes a panelist server 108, which performs other analytic functions on the data in the database 110. As illustrated in more detail below with respect to FIG. 8D, the panelist server 108 can correlate panelists with advertisement requests, generate reports about individual users or an aggregated set of users, or identify patterns of behavior for individual panelists. Although illustrated as two separate servers, the functionality of the advertisement server 106 and panelist server 108 are combined in some embodiments. Furthermore, the database 110 may be physically included in either the advertisement server 106 or the panelist server 108. In some embodiments, the database 110 is on a separate database server. As one of ordinary skill in the art will recognize, the number of advertisement servers 106 will vary depending on usage—there could be 5, 10, 100, or more advertisement servers 106 to accommodate the load.

FIG. 1 also illustrates a user 100 who accesses web resources through a client computer 102 (e.g., desktop computer) and/or a personal user device 104 (e.g., smartphone, laptop computer, tablet computer, or other mobile computing device). Executing on the computer 102 or personal device 104 is a software application 116, which may be a web application that executes within a web browser. Associated with the application 116 is a cookie 122 or 124, which is used when the application 116 seeks access to any resources on the Internet. If an individual user 100 has both a desktop computer 102 and a personal device 104, each will have its own cookie (e.g., cookie 122 or cookie 124) because the cookie identifies both the device (computer 102 or personal device 104) and the application 116. The illustration in FIG. 1 also shows a second application 118 executing on the personal device 104. Even though both application 118 and application 116 are executing on the same personal device 104, each has its own cookie (e.g., cookie 124 for the first application 116 and cookie 126 for the second application 118).

As FIG. 1 illustrates, the personal user device 104 can execute the same software application 116 and 118, using the same cookies 124 and 126, whether the personal user device is at home or away from home. When the user 100 uses the personal device 104 at home, the web activity is routed through the home router 112. In addition, all web activity from the client computer 102 is routed through the home router 112. Commonly the client computer 102 is connected to the home router by a cable 136 (e.g., Ethernet), whereas the personal device 104 is connected to the home router 112 over a WiFi link 138. As described in greater detail below with respect to FIGS. 8A-8D and 9A-9D, the home router 112 includes a meter 130 that measures and tracks certain information.

When the personal device 104 is away from home, the user 100 can access the same applications 116 and 118 as long as the personal device 104 can connect to the Internet through a WiFi access point 134 or a cellular phone tower 132 (e.g. 3G or 4G). As illustrated, all of the devices communicate over one or more communication networks 140.

Figure 2:
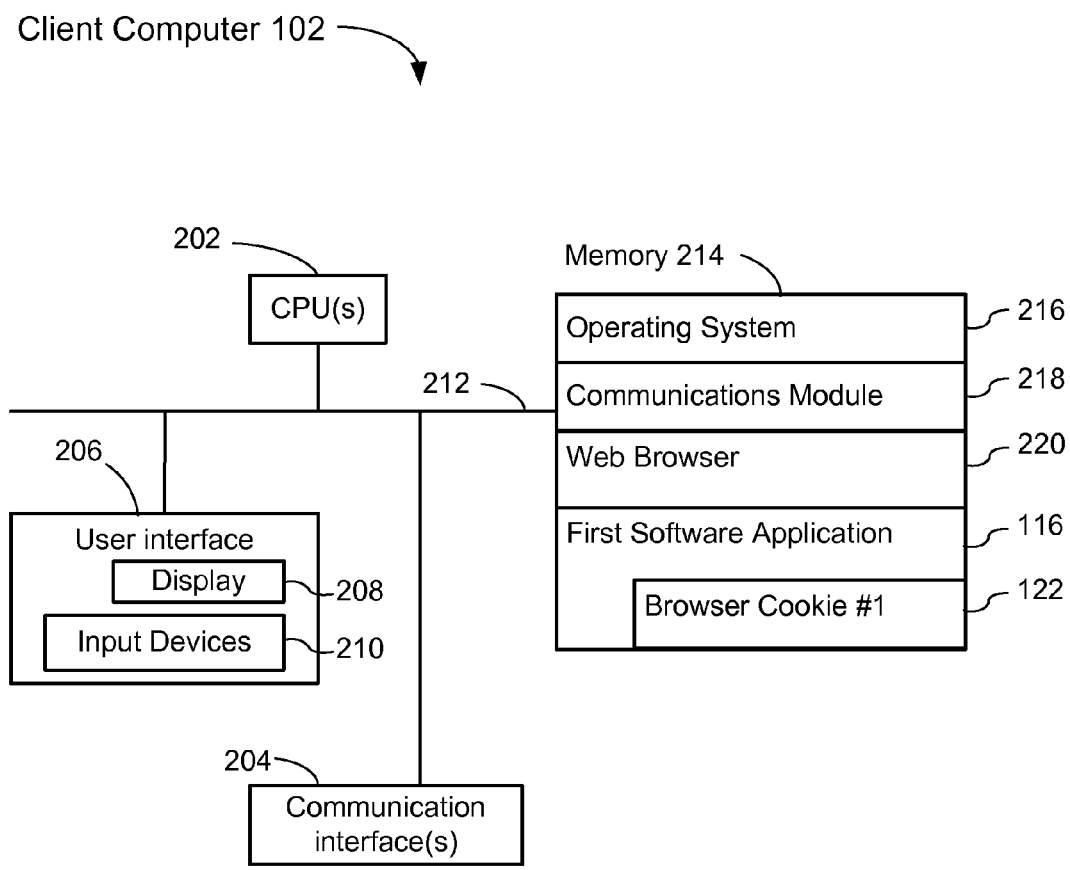
FIG. 2 is a functional block diagram of a client household computer in accordance with some embodiments.

FIG. 2 illustrates a typical client computer 102 at a household. A client computer 102 generally includes one or more processing units (CPUs) 202, one or more network or other communications interfaces 204, memory 214, and one or more communication buses 212 for interconnecting these components. The communication buses 212 may include circuitry (sometimes called a chipset) that interconnects and controls communications between system components. A client computer 102 includes a user interface 206, for instance a display 208 and one or more input devices 210, such as a keyboard and a mouse. Memory 214 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214 may include mass storage that is remotely located from the central processing unit(s) 202. Memory 214, or alternately the non-volatile memory device(s) within memory 214, comprises a computer readable storage medium. In some embodiments, memory 214 or the computer readable storage medium of memory 214 stores the following programs, modules and data structures, or a subset thereof:

- an operating system 216 (e.g., WINDOWS or MAC OS X) that generally includes procedures for handling various basic system services and for performing hardware dependent tasks;
- a network communications module 218 that is used for connecting the client computer 102 to servers or other computing devices via one or more communication networks 140, such as the Internet, other wide area networks, local area networks, metropolitan area networks, and the like;
- a web browser 220, which allows a user 100 of the client computer 102 to access web sites and other resources over the communication network; and
- a first software application 116, which may be a web application. The software application 116 accesses web resources. When the application 116 requests web resources, it includes a cookie 122 with the request.

Figure 3:
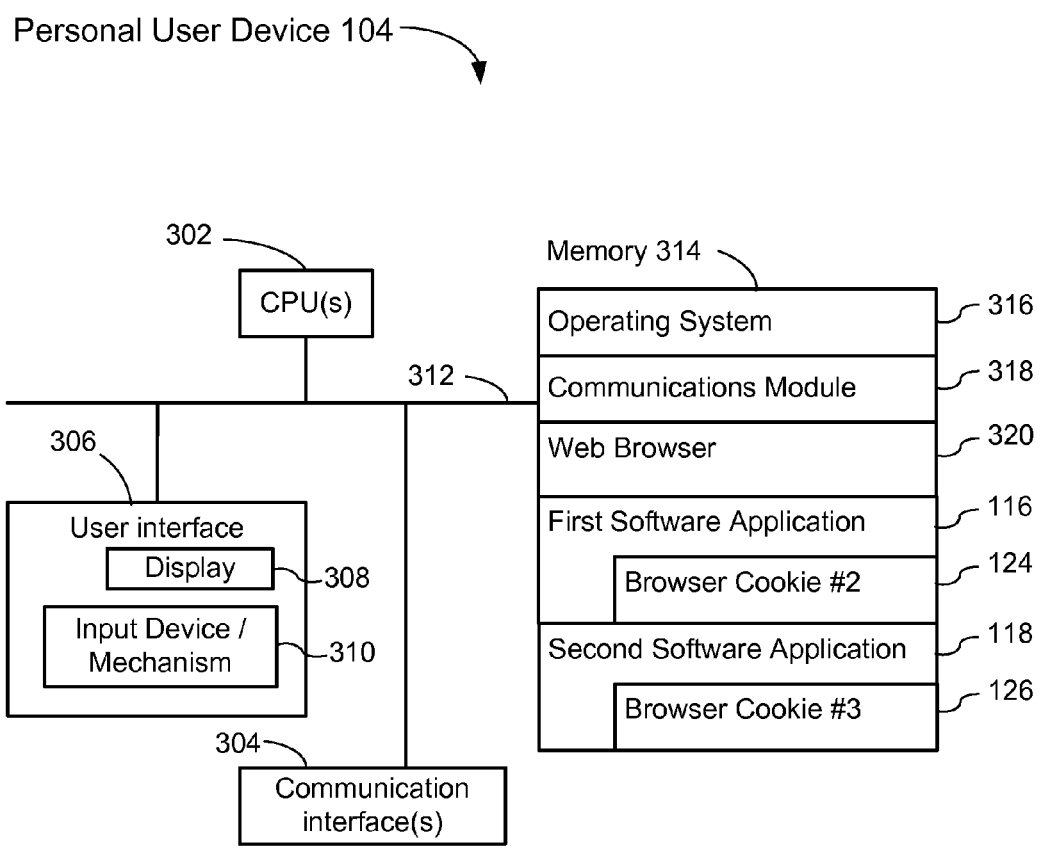
FIG. 3 is a functional block diagram of a personal user device in accordance with some embodiments.
Figure 4:
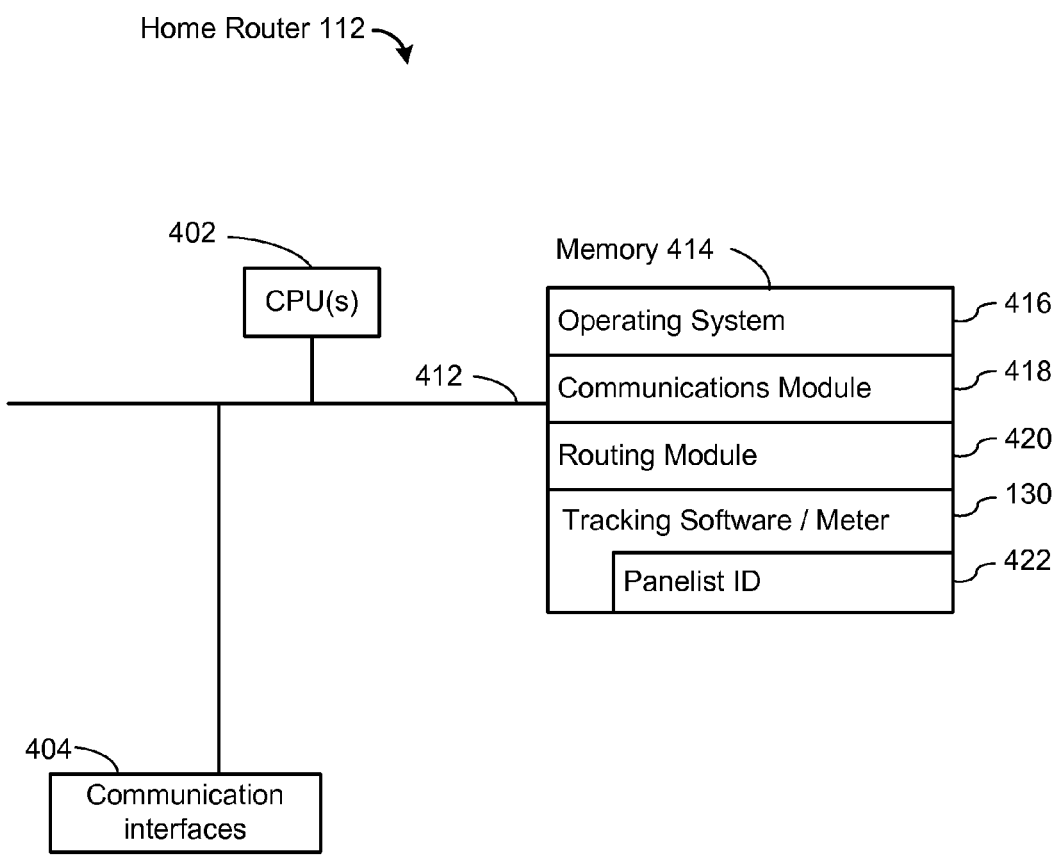
FIG. 4 is a functional block diagram of a home router in accordance with some embodiments.

FIG. 3 illustrates a typical personal user device 104. Personal user devices 104 include laptop computers, tablet computers, smartphones, and other mobile computing devices that access the Internet. A personal device 104 generally includes one or more processing units (CPUs) 302, one or more network or other communications interfaces 304, memory 314, and one or more communication buses 312 for interconnecting these components. The communication buses 312 may include circuitry (sometimes called a chipset) that interconnects and controls communications between system components. A personal device 104 includes a user interface 306, for instance a display 308 and one or more input devices or mechanisms 310, such as a touch sensitive display (sometimes referred to as a touch screen) or a keyboard and a mouse. In some embodiments, the display 308 and input device/mechanism 310 are combined (e.g., a touch sensitive display). With a touch sensitive display 308, the display 308 provides "buttons" or a "keyboard" as needed. Memory 314 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may include mass storage that is remotely located from the central processing unit(s) 302. Memory 314, or alternately the non-volatile memory device(s) within memory 314, comprises a computer readable storage medium. In some embodiments, memory 314 or the computer readable storage medium of memory 314 stores the following programs, modules and data structures, or a subset thereof:

- an operating system 316 (e.g., ANDROID™, iOS™, WINDOWS®, or MAC OS X) that generally includes procedures for handling various basic system services and for performing hardware dependent tasks;
- a network communications module 318 that is used for connecting the personal user device 104 to servers or other computing devices via one or more communication networks 140, such as the Internet, other wide area networks, local area networks, metropolitan area networks, and the like;
- a web browser 320, which allows a user 100 of the personal user device 104 to access web sites and other resources over the communication network;
- a first software application 116, which may be a web application. The software application 116 accesses web resources. When the application 116 requests web resources, it includes a cookie 124 with the request; and
- a second software application 118, which may be a web application. The software application 118 accesses web resources. When the application 118 requests web resources, it includes a cookie 126 with the request Referring to FIG. 4, a home router 112 generally includes one or more processing units (CPUs) 402, a plurality of network or other communications interfaces 404, memory 414, and one or more communication buses 412 for interconnecting these components. The communication buses 412 may include circuitry (sometimes called a chipset) that interconnects and controls communications between system components. Memory 414 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 (e.g., LINUX or UNIX) that generally includes procedures for handling various basic system services and for performing hardware dependent tasks;
- a network communications module 418 that is used for connecting the router 112 to servers or other computing devices via one or more communication networks 140, such as the Internet, other wide area networks, local area networks, metropolitan area networks, and the like;

a routing module 420 that passes data, such as web pages and email, between computers on the home network (e.g., client computer 102 or personal user device 104) and a cable or DSL modem, which connects to the Internet through an Internet service provider (ISP). The routing module 420 reads packets of data and forwards them to a final destination using a routing table and/or routing policy; and tracking software 130, which identifies and stores cookies as they are forwarded through the router. In some embodiments, the tracking software also measures and/or stores advertisement exposure by identifying advertisements that are delivered to the user in response to an advertisement request. The tracking software 130 stores a panelist ID 422 for the household, and sends information to a panelist server to correlate the panelist ID 422 with cookies saved by applications 116 and 118.

Figure 5:
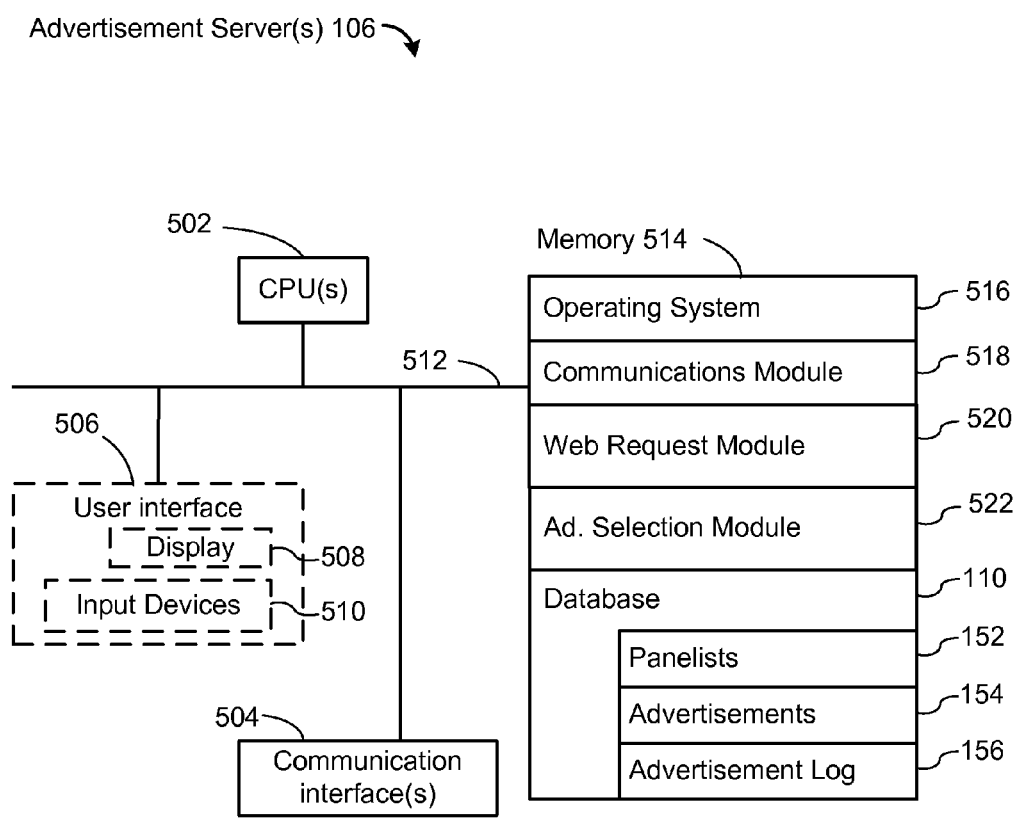
FIG. 5 is a functional block diagram of an advertisement server in accordance with some embodiments.

Referring to FIG. 5, an advertisement server 106 generally includes one or more processing units (CPUs) 502, one or more network or other communications interfaces 504, memory 514, and one or more communication buses 512 for interconnecting these components. The communication buses 512 may include circuitry (sometimes called a chipset) that interconnects and controls communications between system components. A advertisement server 106 may optionally include a user interface 506, for instance a display 508 and a keyboard 510. Memory 514 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 514 may include mass storage that is remotely located from the central processing unit(s) 502. Memory 514, or alternately the non-volatile memory device(s) within memory 514, comprises a computer readable storage medium. In some embodiments, memory 514 or the computer readable storage medium of memory 514 stores the following programs, modules and data structures, or a subset thereof:

an operating system 516 (e.g., LINUX or UNIX) that generally includes procedures for handling various basic system services and for performing hardware dependent tasks;

a network communications module 518 that is used for connecting the advertisement server 106 to other servers or other computing devices via one or more communication networks 140, such as the Internet, other wide area networks, local area networks, metropolitan area networks, and the like;

a web request module 520, which responds to advertisement requests;

an advertisement selection module 522, which selects appropriate advertisements to deliver in response to advertisement requests. The selection process may utilize various data about the panelist (see, e.g., FIG. 7A) and/or data about various advertisements (see, e.g., FIG. 7B) and/or historical information from an advertisement log 156 (see, e.g., FIG. 7C) indicating what advertisements have previously been presented to the panelist; and a database 110, which stores panelist data 152, advertisement data 154, and an advertisement log 156.

In the embodiment illustrated in FIG. 5, the database 110 is stored at the advertisement server 106. In other embodiments, the database 110 is maintained on a separate database server (see, e.g., FIG. 1), or at the panelist server 108. When there are multiple advertisement servers 106, the database 110 is typically stored on a separate database server (or servers).

Figure 6:
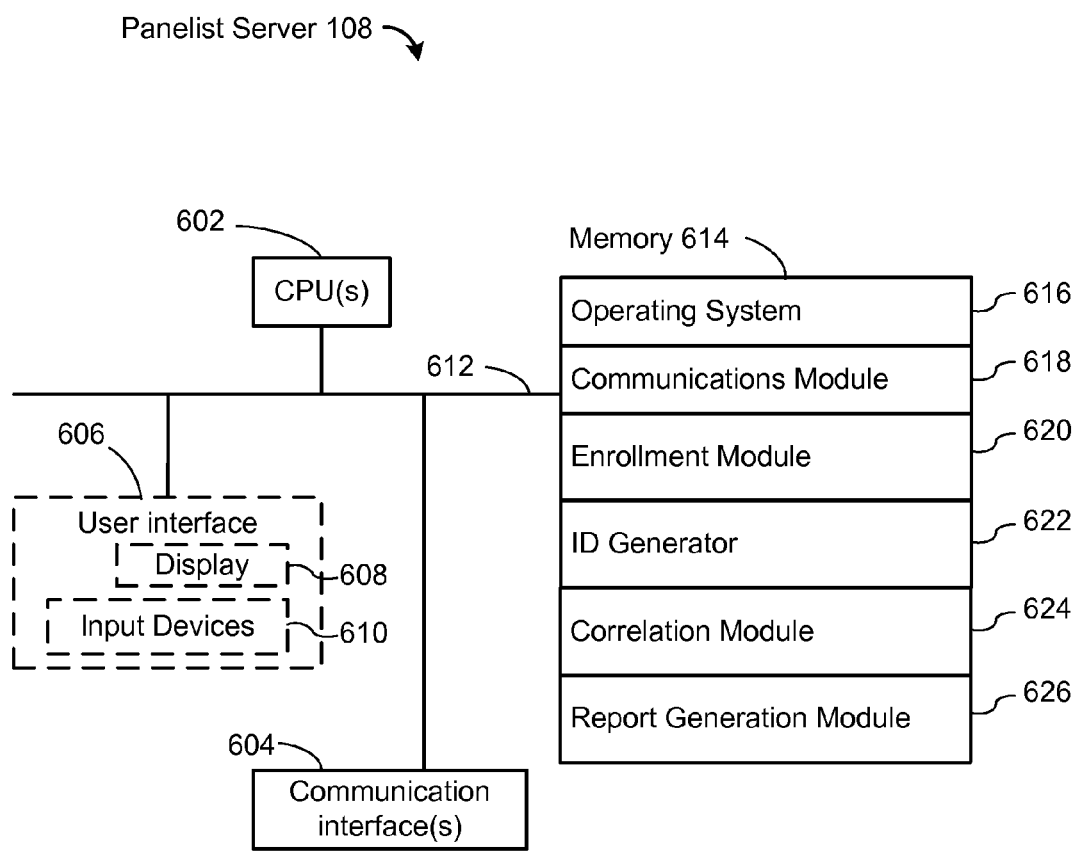
FIG. 6 is a functional block diagram of a panelist server in accordance with some embodiments.

Referring to FIG. 6, the panelist server 108 generally includes one or more processing units (CPUs) 602, one or more network or other communications interfaces 604, memory 614, and one or more communication buses 612 for interconnecting these components. The communication buses 612 may include circuitry (sometimes called a chipset) that interconnects and controls communications between system components. The panelist server 108 may optionally include a user interface 606, for instance a display 608 and a keyboard 610. Memory 614 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 614 may include mass storage that is remotely located from the central processing unit(s) 602. Memory 614, or alternately the non-volatile memory device(s) within memory 614, comprises a computer readable storage medium. In some embodiments, memory 614 or the computer readable storage medium of memory 614 stores the following programs, modules and data structures, or a subset thereof:

an operating system 616 (e.g., LINUX or UNIX) that generally includes procedures for handling various basic system services and for performing hardware dependent tasks;

a network communications module 618 that is used for connecting the panelist server 108 to other servers or other computing devices via one or more communication networks 140, such as the Internet, other wide area networks, local area networks, metropolitan area networks, and the like;

an enrollment module 620, which solicits and enrolls users and households as panelists to have their advertisement exposure tracked. During enrollment, a unique panelist ID 422 is assigned to the user or household. The enrollment process is described in more detail below with respect to FIG. 8A;

an ID generator 622, which generates unique panelist IDs 422 during the panelist enrollment process. In some embodiments, the ID generator 622 generates unique IDs for other objects as well, such as advertisements;

a correlation module 624 which correlates panelist IDs 422 with cookie IDs 704. This process is described in greater detail below with respect to FIG. 8D; and a report generator module 626, which generates various reports based on the panelists 152, advertisements 154, and advertisement log 156 in the database 110. The report generator module 626 generates reports for individual panelists as well as reports of aggregated data from a plurality of panelists.

Although FIGS. 2-6 illustrate various computing devices, these figures are intended more as functional illustrations of the various features that may be present in a single computing device or set of servers, rather than a structural schematic of the embodiments described herein. In practice, and as recognized by those of ordinary skill in the art, items shown separately could be combined and some items could be separated. For example, some items shown separately in FIG. 1 (such as advertisement server 106 and panelist server 108) could be implemented on a single server and single items could be implemented by one or more servers. The actual number of servers used to implement an advertisement tracking system 160, and how features are allocated among them will vary from one embodiment to another, and may depend in part on the amount of data traffic that the system must handle during peak usage periods as well as during average usage periods.

Each of the methods described herein may be performed by instructions that are stored on a computer readable storage medium and that are executed by one or more processors of one or more servers or clients. Each of the operations shown in FIGS. 2-6 may correspond to instructions stored in a computer memory or computer readable storage medium.

FIG. 7A illustrates an exemplary data structure to store panelist data 152. In some embodiments, a "panelist" corresponds to a household. In these embodiments, online advertisement exposure is tracked for all of the members of the household. In some embodiments, a "panelist" corresponds to a single member of a household.

For each panelist, the advertisement tracking system 160 assigns a unique panelist ID 422. The panelist ID 422 uniquely identifies the enrolled household or user. The panelist data structure 152 also stores zero or more cookie IDs 704. Each cookie ID corresponds to a cookie that is used by a software application 116 or 118 on a computer 102 or personal user device 104. Each cookie ID 704 thus uniquely identifies both the application and the device where the application is executing. As illustrated in FIG. 1, two or more distinct applications 116 and 118 executing on the same device (such as personal device 104) have distinct cookies and thus distinct cookie IDs 704. Similarly, FIG. 1 illustrates that the same application 116 utilizes distinct cookies 122 and 124 when executing on different devices (e.g., computer 102 and personal device 104), and each of the cookies 122 and 124 has a distinct cookie ID 704.

The panelist data structure 152 typically includes the names 706 of the household members, as well as demographic data 712 about the household members. For example, some embodiments include age and gender in the demographic data 712. In some embodiments, the panelist data structure 152 includes a network address 708 for the household. The network address 708 is typically the IP address of the cable or DSL modem attached to the home router 112. Note that the "network address" 708 of a panelist is essentially the panelist's "home address." The panelist's network address 708 does not change when a personal user device 104 is used away from home.

In some embodiments, the panelist data structure 152 includes device addresses 710 for each of the computers 102 and personal devices 104 associated with the panelist. Typically, a device address 710 is the MAC address assigned to the network interface card (NIC) used by a computer 102 or personal device 104. In addition to providing a globally unique address, the MAC address generally identifies the type of device.

In some embodiments, the panelist data structure 152 includes an enrollment date 714 and/or an expiration date 716. When used, an expiration date 716 indicates how long a user has agreed to have advertisement exposure tracked. Some embodiments include a status field 718 in the panelist data structure 152. Exemplary status values are "ENROLLING," "ACTIVE," and "INACTIVE." For example, the status may become INACTIVE after the expiration date. In some embodiments, the panelist data structure 152 is stored in one or more tables in a database 110.

FIG. 7B illustrates an exemplary advertisement data structure 154. When an advertisement 734 is created, it is assigned a unique advertisement ID 732. This advertisement ID 732 is included in the advertisement data structure 154. The advertisement data structure 154 also includes the advertisement 734 itself (e.g., image or video). In some embodiments, the advertisement 734 is stored as a binary large object (BLOB) in a database 110. In some embodiments, the advertisement data structure 154 includes keywords 736 that are used to describe or categorize the advertisements 734. In some embodiments, the terms that can be selected as keywords 736 are correlated with panelist demographic data 712. For example, the panelist demographic data may indicate an interest in tennis, and "tennis" may be a term used as a keyword 736 for an advertisement. Instead of or in addition to keywords 736, some embodiments provide target demographics 738 in the advertisement data structure 154. For example, an advertisement 734 could be targeted for men over 40 years old, or for people in a specific geographical region.

In some embodiments, an advertisement 734 can have usage limits 740. For example, an advertiser may not want to pay for presenting an advertisement 734 to a panelist more than a certain number of times (e.g., 2 times). Some embodiments also support aggregated usage limits 740, which limits the total number of times an advertisement 734 is presented to anyone. Some embodiments support limits 740 based on time of day and/or day of week. In some embodiments, target demographics 738 and usage limits 740 are functionally combined because they both filter when an advertisement 734 is returned in response to an advertisement request. In some embodiments, the advertisement data structure 154 includes a status field 742, which indicates the current status of the advertisement 734. For example, some embodiments use status values of "INACTIVE," "ACTIVE," and "TERMINATED." Each advertisement 734 is associated with a specific advertiser, which is identified by an advertiser ID 744. For each advertisement 734, the advertiser has a financial agreement 746 with the operators of the advertisement tracking system 160 regarding pricing for delivering the advertisement 734 to users 100. The financial agreement 746 can be as simple as a fixed price for every advertisement presentation, or can be more complex.

FIG. 7C illustrates some key elements of an exemplary data structure for an advertisement log 156. The advertisement log 156 indicates what advertisements 734 were presented to what users and when. The log 156 includes the advertisement ID 732, which identifies the specific advertisement 734 presented, and the website 758, which identifies the web page displaying the advertisement 734. The log 156 also includes a timestamp 760 that identifies when the advertisement 734 was sent. In some embodiments, the advertisement log 156 includes the IP address 764 of where the advertisement request originated. For example, if the advertisement request originated from a panelist's home, the IP address 764 is the IP address of the home router 112 (or the cable/DSL modem attached to the router 112). If the request originated away from home, the IP address 764 is the address of the WiFi access point 134 or address associated with a cellular phone tower 132. In some embodiments, the advertisement log 156 includes a location 762, which identifies a geographic location of the device (e.g., computer 102 or personal device 104) where the advertisement request originated. In some embodiments, the geographic location 762 is inferred by reverse geocoding based on the IP address 764. When a device, such as a personal device 104, issues an advertisement request, the request includes a cookie. The cookie has a cookie ID 704 (such as the cookie IDs 122, 124, and 126 associated with applications 116 and 118 in FIG. 1). The cookie ID 704 is stored in the advertisement log 156.

In general, an advertisement request does not include a panelist ID 422, because the device (e.g., personal device 104) does not store that information. Disclosed embodiments do not require any special tracking software to run on user devices (e.g., computer 102 or personal device 104). When the advertising request does not include the panelist ID 422, the panelist ID field in the advertisement log 156 is left blank (or NULL). In some embodiments, when an advertisement request passes through the home router 112, the router attaches the panelist ID 422 to the request, in which case the panelist ID 422 is stored in the advertisement log 156 directly. In general, the panelist ID 422 in the advertisement log 156 is filled in later by the panelist server 108. This is described in greater detail below with respect to FIG. 8D.

Figure 8A:
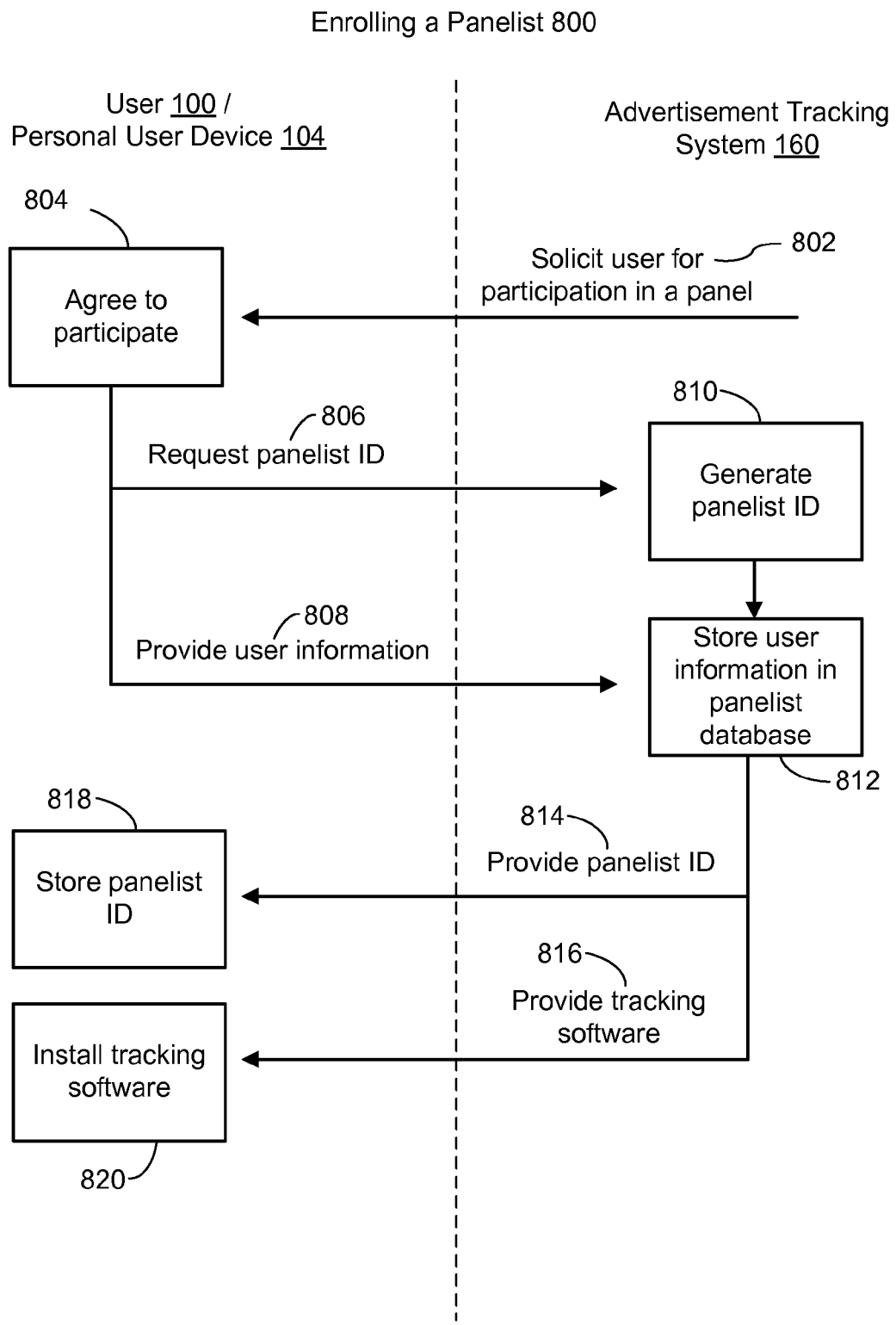
FIG. 8A is an exemplary process flow diagram for enrolling a user or household as a panelist in accordance with some embodiments.

FIG. 8A illustrates an exemplary process 800 for enrolling a user 100 or household as a panelist for tracking of online advertisement exposure. In some embodiments, there is a pre-qualification process that identifies households with appropriate hardware and/or software for advertisement tracking. For example, certain household routers 112 (or versions of software executing on the router 112) may function better with the advertisement tracking system 160. As another example, a household that has a single computer 102 connected directly to a cable/DSL modem without a router 112 would not be suitable for the disclosed embodiments.

Once suitable users 100 or households are identified, the advertisement tracking system 160 solicits (802) the user or household for participation in a panel. The solicitation may be presented as an "advertisement" in a web page, sent as an email, or through similar means. A user agrees (804) to participate in exchange for some benefit (e.g., personalized content, special access, monetary compensation, special offers, reduced cost for access to the Internet, parental control tools, etc.), and provides (808) user information, including demographic data 712. In addition to providing (808) information, the enrollment process requests (806) a panelist ID 422.

When the advertisement tracking system 160 receives the user information and panelist ID request, the system 160 generates (810) a unique panelist ID 422 and stores (812) the user information in a panelist database 152. The tracking system 160 provides (814) the panelist ID 422, which the user's home router 112 stores (818). The tracking system 160 also provides (816) tracking software 130 that runs on the user's home router 112. The home router 112 installs (820) the software 130, enabling it to capture and measure information needed to track advertisement exposure. In some embodiments, there is also tracking software that executes on each computer 102 or personal device 104.

Figure 8B:
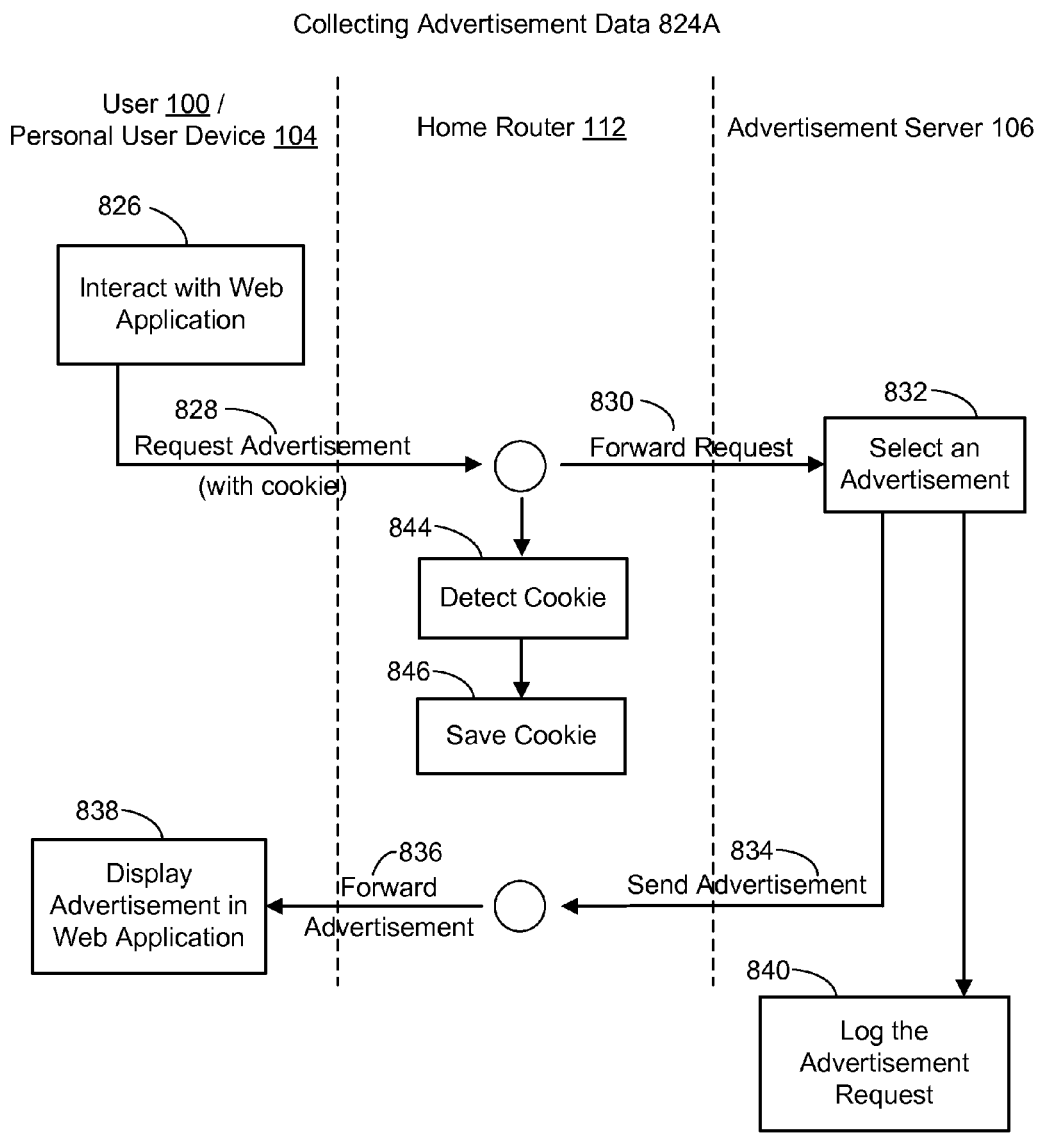
FIG. 8B is an exemplary process flow diagram for collecting advertisement viewing data in accordance with some embodiments.

FIG. 8B illustrates an exemplary process 824A for collecting advertisement data from a home computer 102 or personal device 104. Initially, a user 100 interacts (826) with a web application 116 on a personal user device 104. The web application 116 requests (828) an advertisement to present to the user 100. The advertisement request includes (828) a cookie 124 with cookie ID 704. In the illustrated process 824A, the personal device 104 is connected to the Internet through a home router 112. In this embodiment, the tracking software 130 on the router forwards (830) the request to the advertisement server 106, and also detects (844) the cookie 124 in the request. In some embodiments, the tracking software 130 inserts the panelist ID 422 into the request before forwarding. The router saves (846) the cookie (or just the cookie ID 704) in the memory 414 of the router 112.

The advertisement server 106 selects (832) an advertisement 734 responsive to the advertisement request, and sends (834) the advertisement 734 to the personal device 104 that issued the request. The advertisement server 106 also logs (840) the advertisement request, including the cookie ID 704 of the cookie 124 as well as the advertisement ID 732 of the selected advertisement 734. If the panelist ID 422 is included in the request, the panelist ID 422 is stored with the log record. As illustrated above in FIG. 7C, logging the advertisement request also includes storing a timestamp 760, location 762, and IP address 764 in some embodiments. In some embodiments, selecting (832) a responsive advertisement 734 includes correlation data about the panelist (see, e.g., FIG. 7A) with information about the advertisements (see, e.g., FIG. 7B), and/or correlating advertisement data 154 with data in the advertisement log 156.

The home router 112 receives the advertisement 734 from the advertisement server 106, and forwards (836) the advertisement 734 to the personal user device 104. The application 116 executing on the personal user device 104 then displays (838) the advertisement.

Figure 8C:
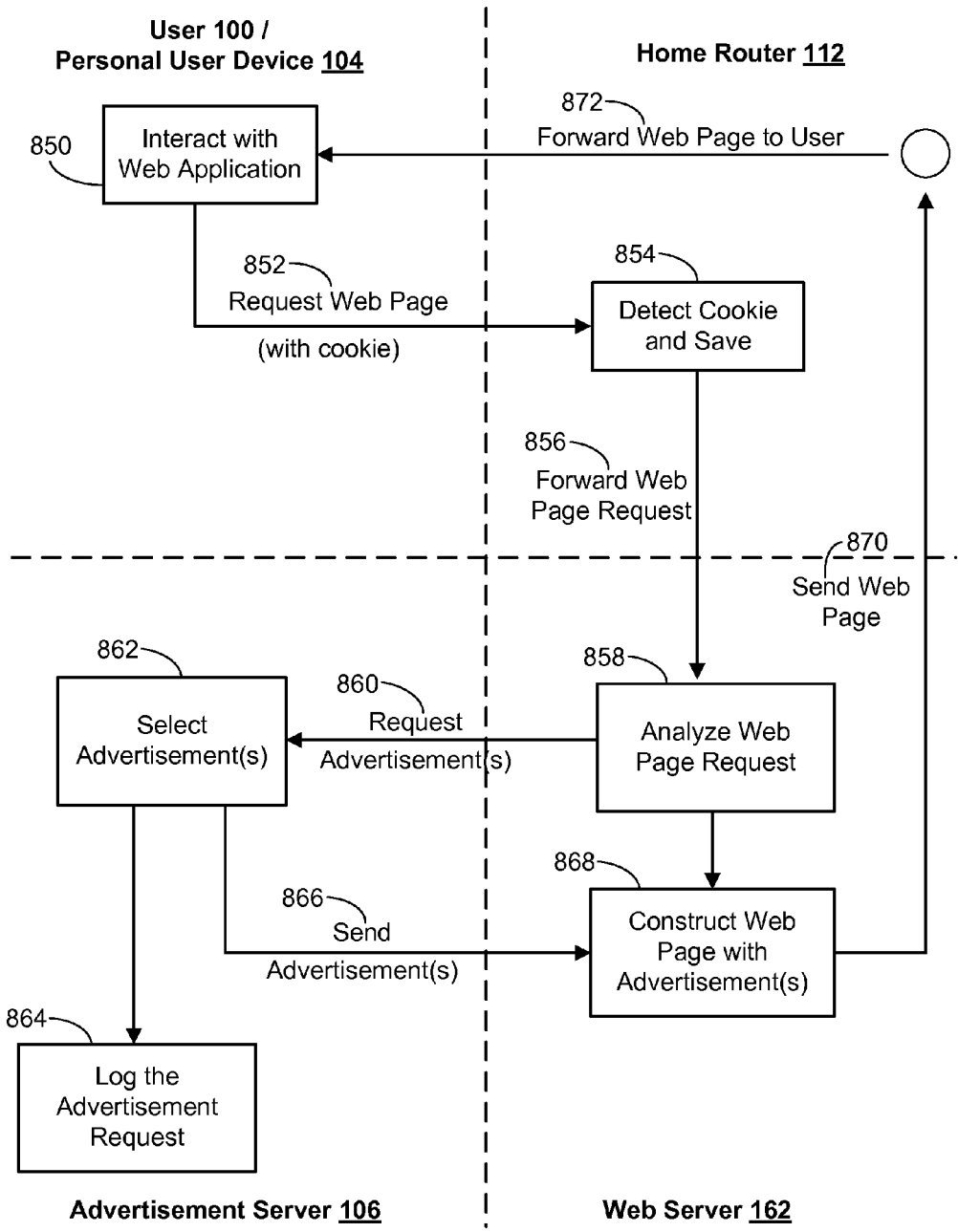
FIG. 8C is an alternative exemplary process flow diagram for collecting advertisement viewing data in accordance with some embodiments.

FIG. 8C illustrates an alternative exemplary process 824B for collecting advertisement data from a home computer 102 or personal device 104. The difference is that in process 824A, the web page is already present on the personal device 104, and the request is just to fill in a new advertisement 734 on the display. In process 824B, a new web page is requested, and the advertisement is filled in by the web server 162 before sending to the computer 102 or personal device 104.

As with process 824A above, a user 100 initially interacts (850) with a software application 116 on a personal user device 104. The web application 116 requests (852) a web page. The request includes the cookie 124 that identifies the application 116 and the personal user device 104. The home router 112 detects (854) the cookie 124 in the request and saves (854) the cookie 124 or its corresponding cookie ID 704. The router 112 forwards (856) the web page request to the appropriate web server 162. In some embodiments, the router 112 inserts the panelist ID 422 into the request before forwarding. The web server 162 analyzes (858) the web page request, and determines (858) that the requested web page includes one or more areas designated for advertisements 734. The web server 162 requests (860) advertisement(s) 734 for the one or more areas. As in process 824A, the advertisement server 106 in process 824B selects (862) advertisements responsive to the web server's request. The advertisement server 106 logs (864) the advertisement request, including the selected advertisement(s) 734, and sends (866) the advertisements to the web server 162. The selection (862) and logging (864) operations are like the selection (832) and logging (840) operations described above with respect to process 824A.

The web server 162 constructs (868) the requested web page, including the advertisement(s) 734 provided by the advertisement server 106. The web server 162 then sends (870) the web page to the router 112, which forwards (872) the web page to the application 116. The application 116 displays the web page and the user 100 continues to interact (850) with the application 116.

Although the processes 824A and 824B in FIGS. 8B and 8C illustrate the case where the personal user device 104 is connected to the Internet through the home router 112, the process is essentially the same when the personal user device 104 is connected to the Internet through an alternative WiFi access point 134 or cellular network 132 (e.g., 3G or 4G). The primary difference is that the WiFi access point 134 or cellular network 132 is not running the tracking software 130, and thus does not detect or save the cookies (e.g., cookie 124) included in advertisement requests. Even when the cookie 124 is not detected or saved by an intermediary router, the cookie 124 is included in the request, and thus the advertisement server 106 receives the cookie 124. Therefore, the advertisement server 106 is still able to save the cookie ID 704 in the advertisement log 156.

Figure 8D:
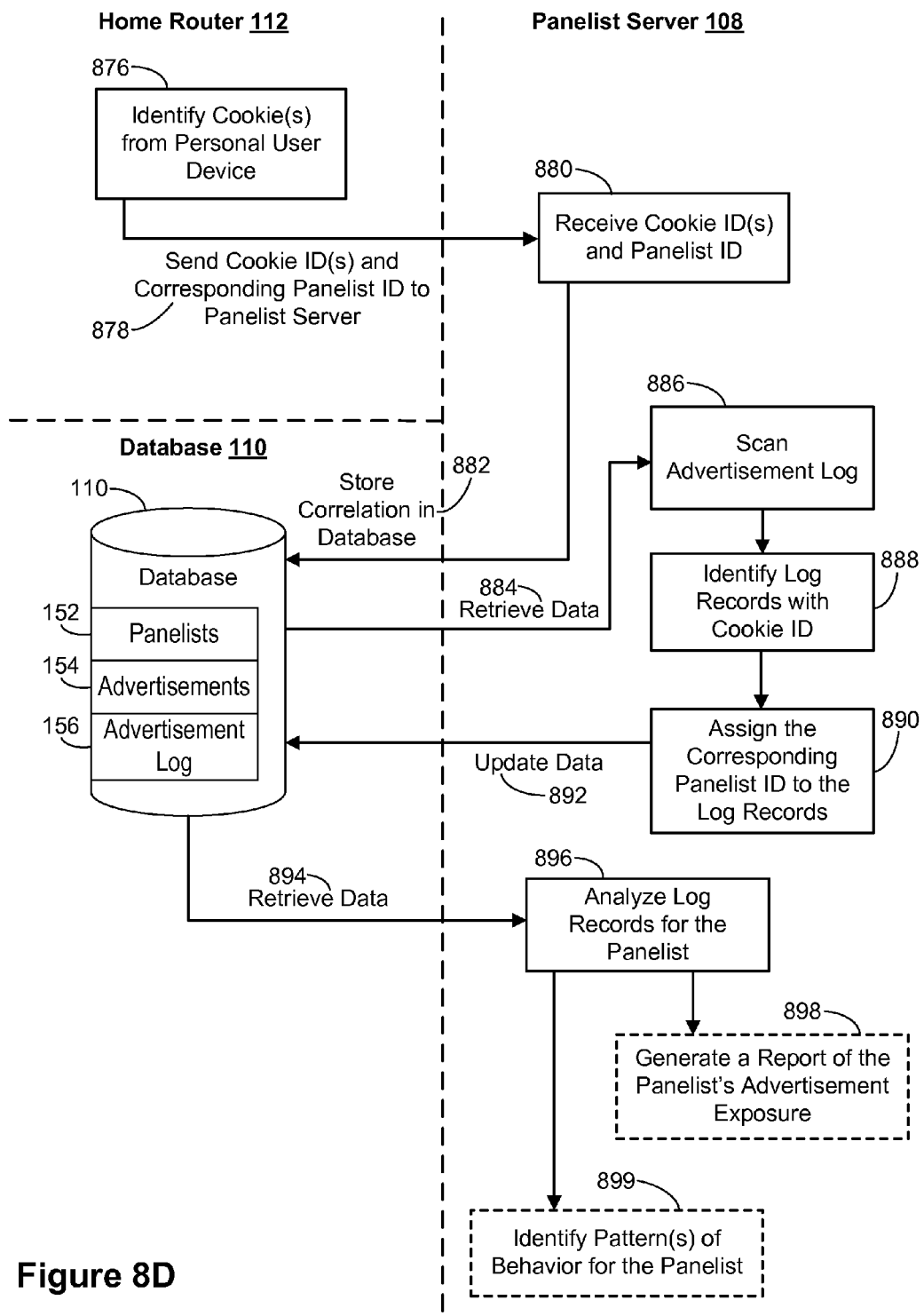
FIG. 8D is an exemplary process flow diagram for utilizing collected advertisement viewing data in accordance with some embodiments.
Figure 9A:
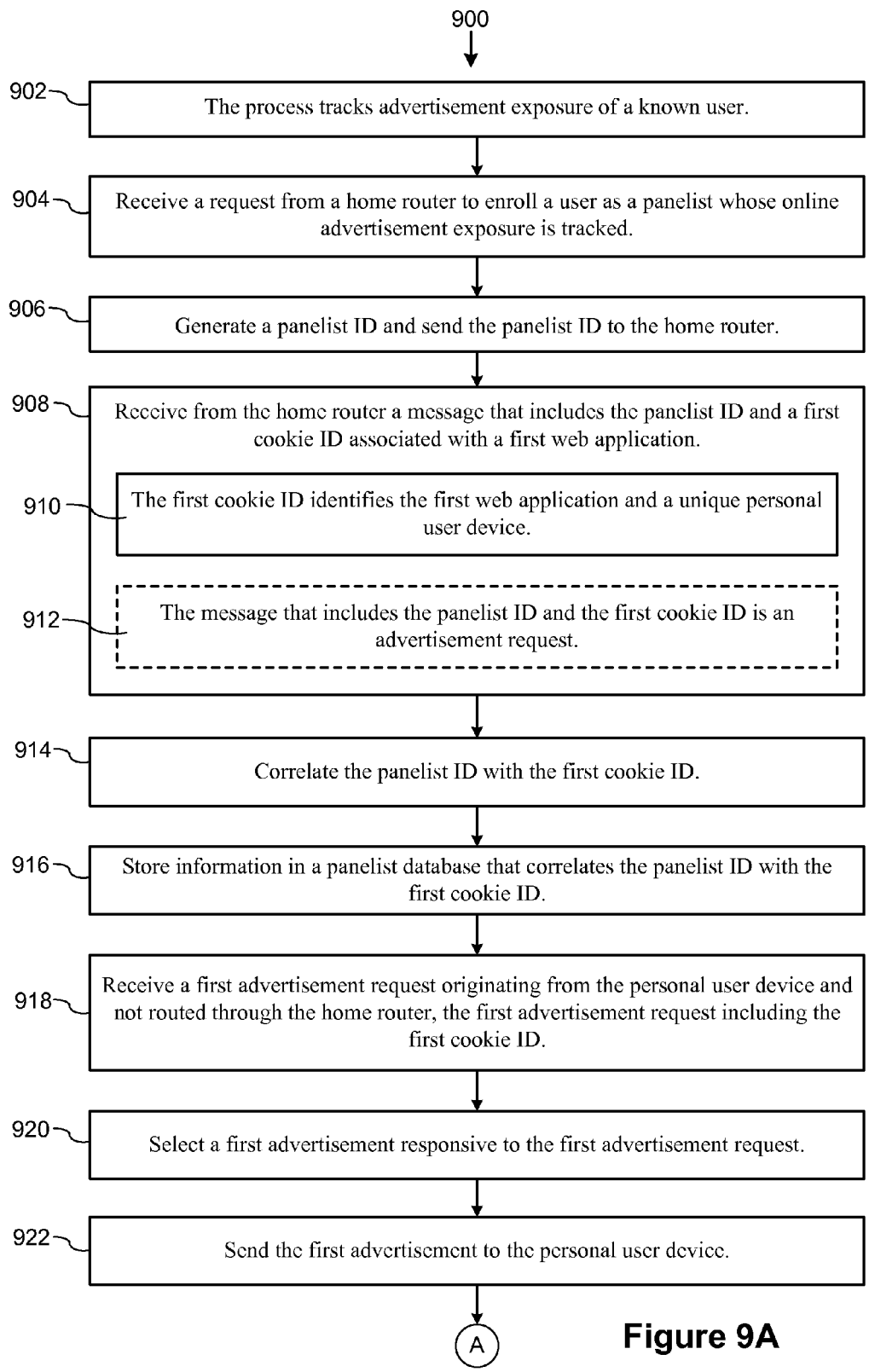
FIGS. 9A-9D illustrate an exemplary process for tracking online advertisement exposure according to some embodiments.
Figure 9B:
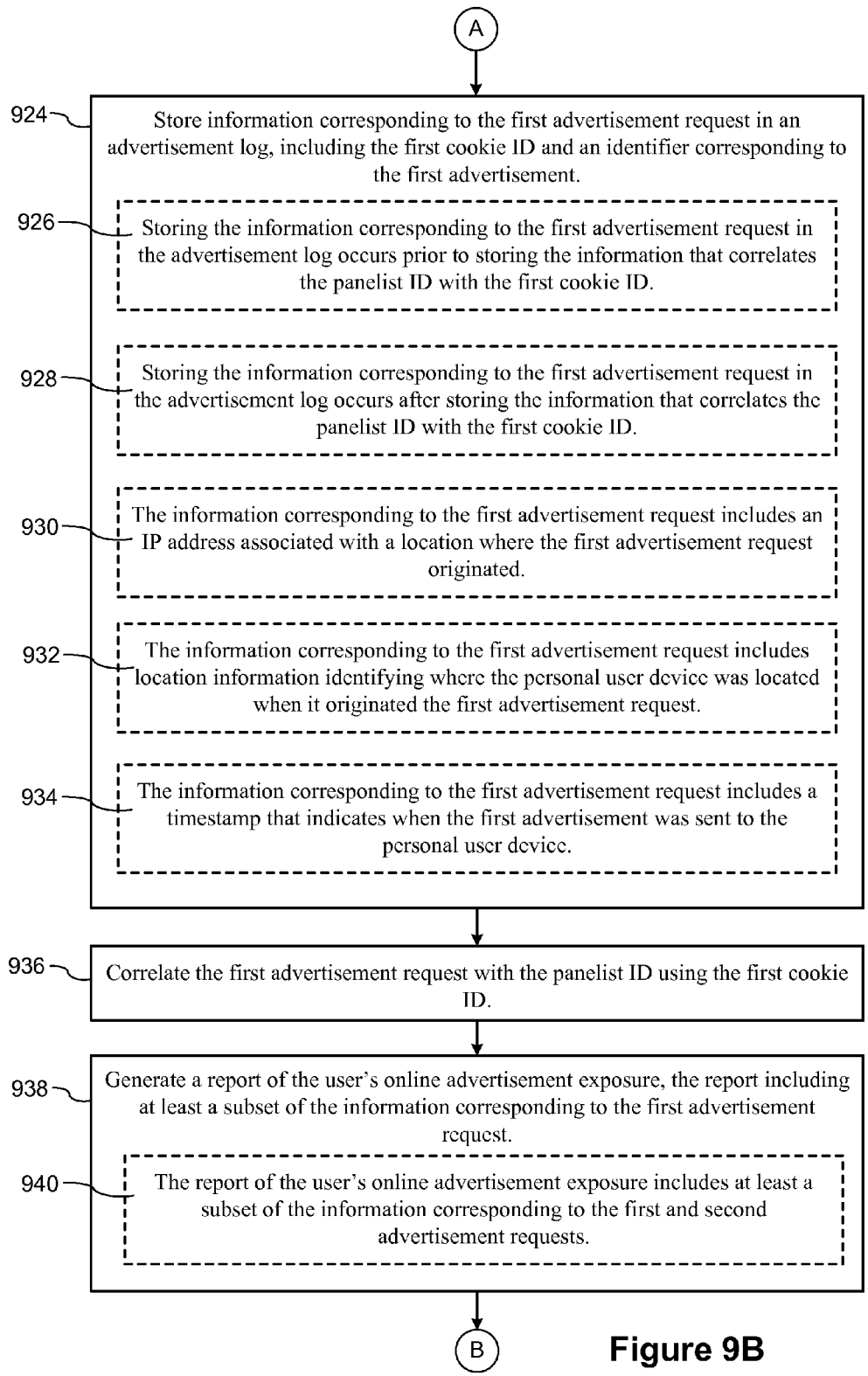
Figure 9C:
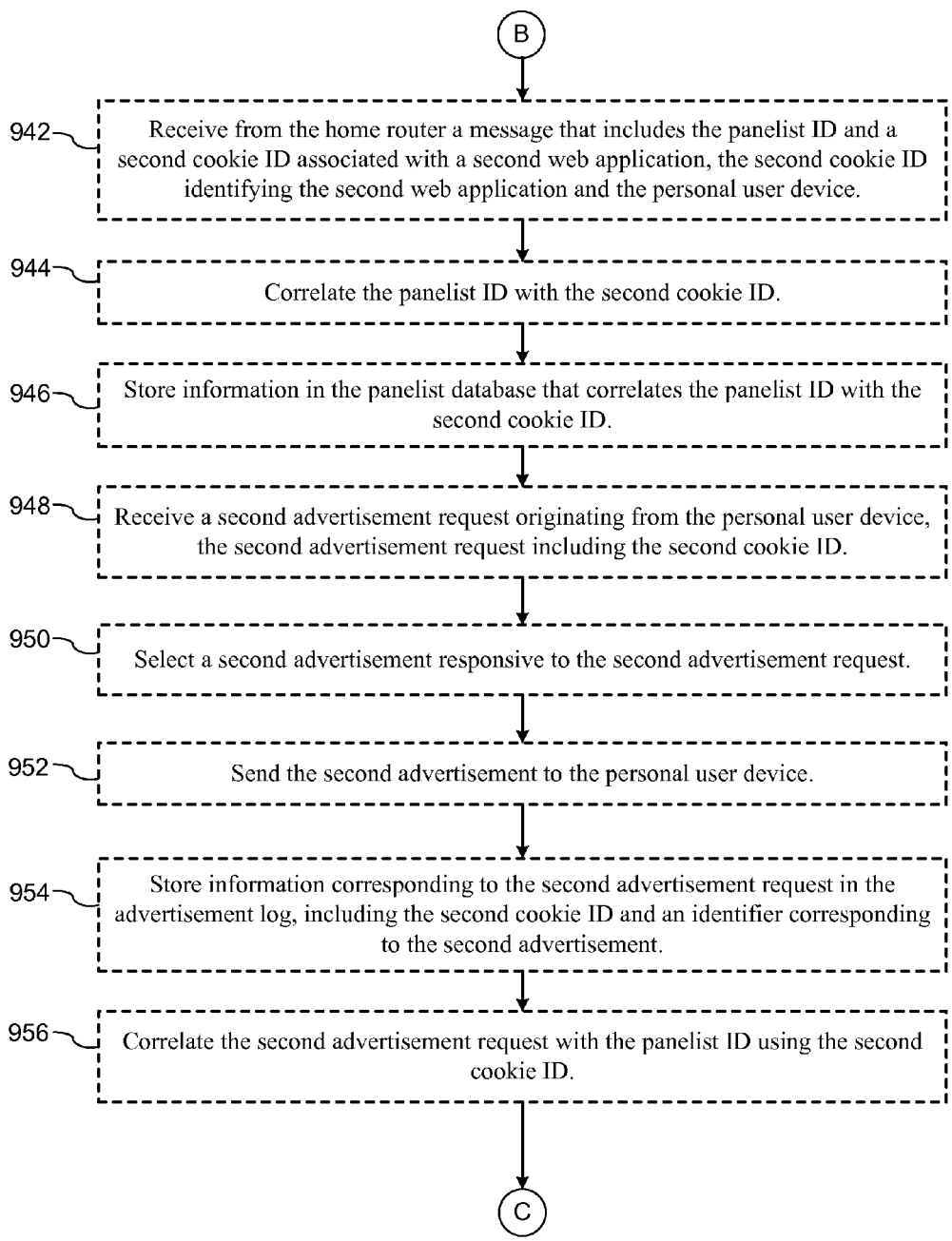
Figure 9D:
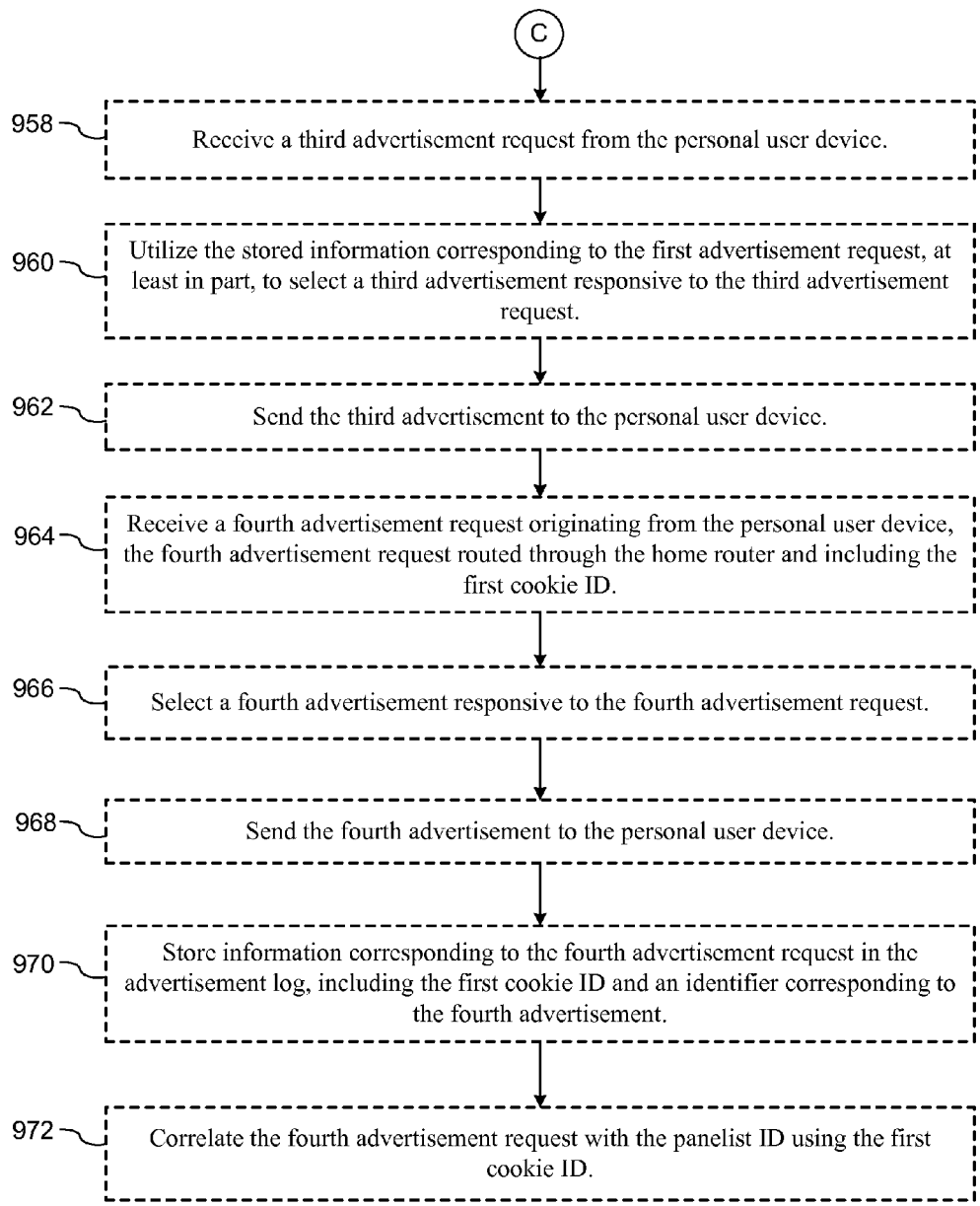

FIG. 8D illustrates an exemplary process 874 for utilizing collected advertisement data. As illustrated in FIGS. 8B and 8C, the home router 112 identifies (876) cookies from a personal user device 104. The router 112 sends (878) the cookie IDs 704 and corresponding panelist ID 422 to the panelist server 108. The panelist server 108 receives (880) the cookie IDs 704 and the panelist ID 422 from the router 112, then stores (882) the correlation between the panelist ID 422 and the cookie IDs 704 in the database 110. Because this correlation is stored in the database 110, the panelist server 108 only needs to receive the information once for each cookie ID 704.

At some point in time, the panelist server 108 retrieves (884) data from the advertisement log 156. The objective is to identify log entries without a panelist ID 422 and fill in those missing entries based on the correlation between the panelist ID 422 and one or more cookie IDs 704. The panelist server 108 retrieves (884) data from the advertisement log 156 and scans (886) the data for log records without a panelist ID 422 (e.g., blank or NULL). The panelist server 108 identifies (888) one or more log records that have no assigned panelist ID 422, but for which the panelist ID 422 is known based on the correlation between a cookie ID 704 and the panelist ID 422. The panelist server 108 assigns (890) the corresponding panelist ID 422 to the log records, and updates (892) the advertisement log 156 in the database 110 with the panelist ID assignment.

Although storing the panelist ID 422 associated with each cookie ID occurs only once for each cookie ID, the process (884-892) of scanning and assigning a panelist ID to log records occurs repeatedly. For example, in some embodiments, each time a new log record is added to advertisement log 156 based on exposure to an advertisement out of home, the newly added log record does not have an assigned panelist ID. Therefore, regular scans are needed.

In some embodiments, not illustrated in FIG. 8D, the panelist ID 422 is assigned to log records as they are created as long as the correlation between the relevant cookie ID 704 and the panelist ID 422 is known. In some of these embodiments, there is an initial scan of the log when a cookie ID 704 is first correlated to a panelist ID 422, and then subsequent logging of advertisement requests with the same cookie ID 704 store the panelist ID 422 as the log records are created.

Embodiments utilize the advertisement log 156 in various ways. In each case, the panelist server 108 retrieves (894) a set of data from the database 110, including data from the advertisement log 156. The retrieved data is for an individual panelist ID 422, or for an aggregated set of panelists. When the data is aggregated, the aggregation is typically based on characteristics of the panelists or the advertisements (see FIGS. 7A and 7B). The panelist server 108 analyzes (896) the log records for the panelist (or set of panelists). In some embodiments, the panelist server 108 generates (898) a report of the panelist's advertisement exposure, or the advertisement exposure for the selected set of panelists. In some embodiments, the panelist server 108 identifies (899) patterns of behavior for the panelist or set of panelists.

This analysis provides:
  better information about how users traverse the web, both at home and out of home;
  greater ability to report to advertisers on what demographics are seeing their advertisements; and
  optimization of how advertisements are served to users who visit websites, because there is a better idea of which people visit the websites.

FIGS. 9A-9D illustrate an exemplary process 900 that tracks (902) online advertisement exposure of users in a household. The process 900 is performed by an advertising tracking system 160, which includes one or more servers, each having one or more processors and memory. In process 900, the system 160 receives (904) a request from a home router 112 to enroll a user 100 as a panelist whose online advertisement exposure is tracked. The system 160 generates (906) a panelist ID 422 and sends the panelist ID 422 to the home router 112. This enrollment process is described in greater detail above with respect to FIG. 8A.

The system 160 receives (908) from the home router 112 a message that includes the panelist ID 422 and a first cookie ID 704 associated with a first web application 116. The first cookie ID 704 identifies (910) the first web application 116 and a unique personal user device 104. In some embodiments, the message that includes the panelist ID 422 and the first cookie ID 704 is (912) an advertisement request. The system 160 correlates (914) the panelist ID 422 with the cookie ID 704. The system 160 stores (916) information in a panelist database 152 that correlates the panelist ID 422 with the first cookie ID 704. This correlation process is described in greater detail above with respect to FIG. 8D.

The system receives (818) a first advertisement request originating from the personal user device 104 and not routed through the home router 112, the first advertisement request including the first cookie ID 704. The system 160 selects (920) a first advertisement 734 responsive to the first advertisement request, and sends (922) the first advertisement 734 to the personal user device 104. The system 160 stores (924) information corresponding to the first advertisement request in an advertisement log 156, including the first cookie ID 704 and an identifier 732 corresponding to the first advertisement 734. In some embodiments, storing the information corresponding to the first advertisement request in the advertisement log 156 occurs (926) prior to storing the information that correlates the panelist ID 422 with the first cookie ID 704. In other embodiments, storing the information corresponding to the first advertisement request in the advertisement log 156 occurs (928) after storing the information that correlates the panelist ID 422 with the first cookie ID 704.

The advertisement log 156 can include additional information. For example, in some embodiments, the stored information corresponding to the first advertisement request includes (930) an IP address 764 associated with a location where the first advertisement request originated. In some embodiments, the stored information corresponding to the first advertisement request includes (932) location information 762 identifying where the personal user device 104 was located when it originated the first advertisement request. In some embodiments, the stored information corresponding to the first advertisement request includes (934) a timestamp 760 that identifies when the responsive advertisement was sent to the personal user device 104. In some embodiments, the stored information corresponding to the first advertisement request includes the website 758 or web page 758 where the advertisement is displayed.

The system 160 correlates (936) the first advertisement request with the panelist ID 422 using the first cookie ID 704. That is, since the panelist ID 422 is correlated with the cookie ID 704, and the advertisement request is associated with the cookie ID 704, the advertisement request is associated with the panelist ID 422.

The system generates (938) a report of the user's online advertisement exposure (which includes advertisement exposure away from home). The report includes (938) at least a subset of the information corresponding to the first advertisement request. In some embodiments, the report of the user's online advertisement exposure includes (940) at least a subset of the information corresponding to the first and second advertisement requests (the second request is explained below).

As illustrated in FIG. 1, two or more applications 116 and 118 can execute on the same personal user device 104. Each application has its own cookie (122 and 124). In some instances, the system 160 receives (942) from the home router 112 a message that includes the panelist ID 422 and a second cookie ID associated with a second web application 118. The second cookie ID identifies (942) the second web application 118 and the personal user device 104. In this instance, the system 160 correlates (944) the panelist ID 422 with the second cookie ID, and stores (946) information in the panelist database 152 that correlates the panelist ID 422 with the second cookie ID.

When there is a second web application 118 that executes on the personal user device 104, the system 160 receives (948) a second advertisement request originating from the personal user device 104, which includes the second cookie ID. The system 160 selects (950) a second advertisement responsive to the second advertisement request and sends (952) the second advertisement to the personal user device 104. The system 160 stores (954) information corresponding to the second advertisement request in the advertisement log 156, including the second cookie ID and an identifier corresponding to the second advertisement. The system 160 correlates (956) the second advertisement request with the panelist ID 422 using the second cookie ID.

In some instances, the system 160 receives (958) a third advertisement request from the personal user device 104. The system 160 utilizes (960) the stored information corresponding to the first advertisement request, at least in part, to select (960) a third advertisement responsive to the third advertisement request. The system then sends (962) the third advertisement to the personal user device 104.

In some instances, the system 160 receives (964) a fourth advertisement request originating from the personal user device 104. The fourth advertisement request is routed (964) through the home router 112 and includes (964) the first cookie ID 704. The system selects (966) a fourth advertisement responsive to the fourth advertisement request, and sends (968) the fourth advertisement to the personal user device. The system stores (970) information corresponding to the fourth advertisement request in the advertisement log 156, including the first cookie ID 704 and an identifier corresponding to the fourth advertisement. The system 160 correlates (972) the fourth advertisement request with the panelist ID 422 using the first cookie ID 704.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of tracking advertisement exposure of a known user, performed at a server having one or more processors and memory storing one or more programs executable by the one or more processors, the method comprising:
generating a device independent panelist ID for a user newly enrolled as a panelist and sending the panelist ID to a home router associated with the user, wherein the home router stores the panelist ID;
receiving from the home router a message generated by the home router that includes the panelist ID and a first cookie ID associated with a first web application, the first cookie ID identifying the first web application and a unique personal user device employed by the user to utilize the first web application;
storing in a panelist database a record that correlates the panelist ID with the first cookie ID;
retrieving from an advertisement log a log record of a first advertisement provided to the user at the personal user device, wherein the log record includes the first cookie ID and an identifier corresponding to the first advertisement;
correlating the first advertisement with the panelist ID using the correlation between the panelist ID and the first cookie ID stored in the panelist database; and
assigning the panelist ID to the log record in the advertisement log.

2. The method of claim 1, wherein the log record includes an IP address associated with a location where the first advertisement was provided to the user.

3. The method of claim 1, wherein the log record includes location in formation identifying where the personal user device was located when the first advertisement was provided to the user.

4. The method of claim 1, wherein the log record includes a timestamp that indicates when the first advertisement was provided to the user.

5. The method of claim 1, further comprising:
receiving from the home router a message generated by the home router that includes the panelist ID and a second cookie ID associated with a second web application, the second cookie ID identifying the second web application and the personal user device;
storing in the panelist database a second record that correlates the panelist ID with the second cookie ID;
retrieving from an advertisement log a second log record of a second advertisement provided to the user at the personal user device, wherein the second log record includes the second cookie ID and an identifier corresponding to the second advertisement;
correlating the second advertisement with the panelist ID using the correlation between the panelist ID and the second cookie ID stored in the panelist database; and
assigning the panelist ID to the second log record in the advertisement log.

6. The method of claim 1, further comprising at an advertisement server having one or more processors and memory storing one or more programs executable by the one or more processors:
receiving an advertisement request from the personal user device;
utilizing the log record, at least in part, to select a third advertisement responsive to the advertisement request; and
sending the third advertisement to the personal user device.

7. The method of claim 1, wherein the message that includes the panelist ID and the first cookie ID is an advertisement request.

8. A server system, comprising one or more server computers, each server computer including:
one or more processors;
memory; and one or more programs stored in the memory for execution by the one or more processors, the one or more programs comprising instructions for:

generating a device independent panelist ID for a user newly enrolled as a panelist and sending the panelist ID to a home router associated with the user, wherein the home router stores the panelist ID;

receiving from the home router a message generated by the home router that includes the panelist ID and a first cookie ID associated with a first web application, the first cookie ID identifying the first web application and a unique personal user device employed by the user to utilize the first web application;

storing in a panelist database a record that correlates the panelist ID with the first cookie ID;

retrieving from an advertisement log a log record of a first advertisement provided to the user at the personal user device, wherein the log record includes the first cookie ID and an identifier corresponding to the first advertisement;

correlating the first advertisement with the panelist ID using the correlation between the panelist ID and the first cookie ID stored in the panelist database; and assigning the panelist ID to the log record in the advertisement log.

9. The server system of claim 8, wherein the log record includes an IP address associated with a location where the first advertisement was provided to the user.

10. The server system of claim 8, wherein the log record includes location information identifying where the personal user device was located when the first advertisement was provided to the user.

11. The server system of claim 8, wherein the log record includes a timestamp that indicates when the first advertisement was provided to the user.

12. The server system of claim 8, wherein the one or more programs further comprise instructions for:

receiving from the home router a message generated by the home router that includes the panelist ID and a second cookie ID associated with a second web application, the second cookie ID identifying the second web application and the personal user device;

storing in the panelist database a second record that correlates the panelist ID with the second cookie ID;

retrieving from an advertisement log a second log record of a second advertisement provided to the user at the personal user device, wherein the second log record includes the second cookie ID and an identifier corresponding to the second advertisement;

correlating the second advertisement with the panelist ID using the correlation between the panelist ID and the second cookie ID stored in the panelist database; and assigning the panelist ID to the second log record in the advertisement log.

13. The server system of claim 8, wherein the one or more programs further comprise instructions for:

receiving an advertisement request from the personal user device;

utilizing the log record, at least in part, to select a third advertisement responsive to the advertisement request; and sending the third advertisement to the personal user device.

14. The server system of claim 8, wherein the message that includes the panelist ID and the first cookie ID is an advertisement request.

15. A non-transitory computer readable storage medium storing one or more programs configured for execution by one or more server computers, each server computer having one or more processors and memory storing one or more programs for execution by the one or more processors, the one or more programs comprising instructions for:

generating a device independent panelist ID for a user newly enrolled as a panelist and sending the panelist ID to a home router associated with the user, wherein the home router stores the panelist ID;

receiving from the home router a message generated by the home router that includes the panelist ID and a first cookie ID associated with a first web application, the first cookie ID identifying the first web application and a unique personal user device employed by the user to utilize the first web application;

storing in a panelist database a record that correlates the panelist ID with the first cookie ID;

retrieving from an advertisement log a log record of a first advertisement provided to the user at the personal user device, wherein the log record includes the first cookie ID and an identifier corresponding to the first advertisement;

correlating the first advertisement with the panelist ID using the correlation between the panelist ID and the first cookie ID stored in the panelist database; and assigning the panelist ID to the log record in the advertisement log.

16. The computer readable storage medium of claim 15, wherein the log record includes an IP address associated with a location where the first advertisement was provided to the user.

17. The computer readable storage medium of claim 15, wherein the log record includes location information identifying where the personal user device was located when the first advertisement was provided to the user.

18. The computer readable storage medium of claim 15, wherein the log record includes a timestamp that indicates when the first advertisement was provided to the user.

19. The computer readable storage medium of claim 15, wherein the one or more programs further comprise instructions for:

receiving from the home router a message generated by the home router that includes the panelist ID and a second cookie ID associated with a second web application, the second cookie ID identifying the second web application and the personal user device;

storing in the panelist database a second record that correlates the panelist ID with the second cookie ID;

retrieving from an advertisement log a second log record of a second advertisement provided to the user at the personal user device, wherein the second log record includes the second cookie ID and an identifier corresponding to the second advertisement;

correlating the second advertisement with the panelist ID using the correlation between the panelist ID and the second cookie ID stored in the panelist database; and assigning the panelist ID to the second log record in the advertisement log.

20. The computer readable storage medium of claim 15, wherein the one or more programs further comprise instructions for:

receiving an advertisement request from the personal user device;

utilizing the log record, at least in part, to select a third advertisement responsive to the advertisement request; and sending the third advertisement to the personal user device.

21. The computer readable storage medium of claim 15, wherein the message that includes the panelist ID and the first cookie ID is an advertisement request.

\* \* \* \* \*

UNITED STATES PATENT AND TRADEMARK OFFICE
CERTIFICATE OF CORRECTION

| | | |
|---|---|---|
| PATENT NO. | : 8,751,303 B2 | Page 1 of 1 |
| APPLICATION NO. | : 13/485759 | |
| DATED | : June 10, 2014 | |
| INVENTOR(S) | : Arini et al. | |

It is certified that error appears in the above-identified patent and that said Letters Patent is hereby corrected as shown below:

In the Claims

Claim 3, col. 16, line 25, please delete "in formation" and insert --information--

Signed and Sealed this
Twenty-sixth Day of August, 2014

Michelle K. Lee
*Deputy Director of the United States Patent and Trademark Office*